June 27, 1961  S. W. POREMBKA, JR  2,990,360
NEUTRONIC REACTOR CONTROL ROD AND METHOD OF FABRICATION
Filed April 8, 1959  2 Sheets-Sheet 1
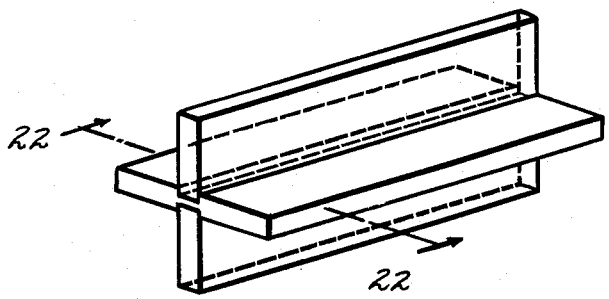
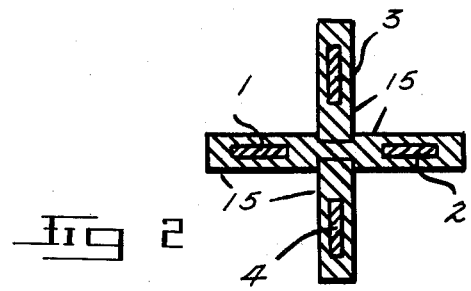
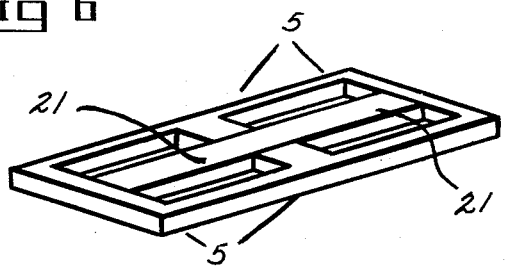
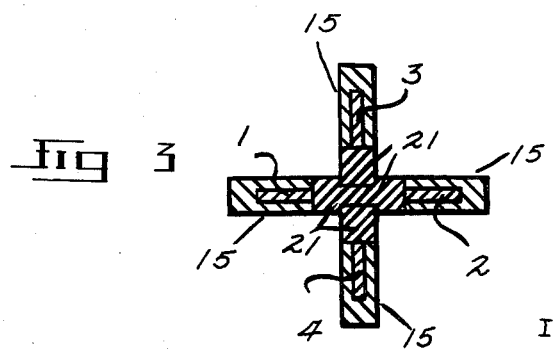
INVENTOR
STANLEY W. POREMBKA, JR.
BY
ATTORNEY

United States Patent Office 2,990,360
Patented June 27, 1961

2,990,360
NEUTRONIC REACTOR CONTROL ROD AND METHOD OF FABRICATION
Stanley W. Porembka, Jr., Pittsburgh, Pa., assignor, by mesne assignments, to the United States of America as represented by the United States Atomic Energy Commission
Filed Apr. 8, 1959, Ser. No. 805,109
5 Claims. (Cl. 204—193.2)

This invention relates to a new and improved method for the manufacture of neutronic reactor control rods, and to new materials for use in the manufacture of neutronic reactor control rods according to such method.

A previously favored material for use in the fabrication of neutronic reactor control rods is the metal hafnium. Hafnium possesses a very high neutron absorption cross section making it ideally suitable for employment as a control rod material and, in addition, hafnium possesses other desirable characteristics, such as corrosion resistance and high strength. There are, unfortunately though, several drawbacks inherent in the use of this metal. To begin with, its separation from the metal zirconium, with which it usually occurs in nature, is difficult and expensive. And secondly, hafnium is in critically short supply, and so attempts have been made to find substitute materials suitable for use in control rods.

A possible substitute is boron, particularly boron enriched in the boron $^{10}$ isotope, since the high thermal neutron absorption cross section of boron$^{10}$ makes it attractive for reactor control rod use. A difficulty is encountered in the use of boron, however, since homogeneous alloys containing boron sometimes suffer severe structural damage as a result of the radiation which they encounter in a neutronic reactor. Furthermore, such alloys often exhibit undesirable brittleness and reduced fabricability due to compound formation.

It has been found that these disadvantages may be overcome by using discrete particles of boron, or compounds containing boron, dispersed in a matrix of some other material. In this manner the radiation damage is confined in the boron containing particles, and the material as a whole retains its structural integrity. Such dispersions utilizing boron or compounds containing boron, in powder form, and a matrix material in powder form, may be conveniently manufactured by powder metallurgical techniques.

Such dispersion compacts do not always exhibit the necessary degree of corrosion resistance, however, and so it has been found necessary to clad such compacts with a sheath of corrosion resistant protective metal.

Accordingly, it is an object of this invention to provide a neutronic reactor control rod which is less expensive than control rods fabricated from hafnium.

It is a further object of this invention to provide a neutronic reactor control rod which may be fabricated from materials which are more readily available than hafnium.

It is a still further object of this invention to provide a neutronic reactor control rod fabricated from materials containing boron, or boron enriched in the boron$^{10}$ isotope.

It is yet another object of this invention to provide a neutronic reactor control rod fabricated from a material containing boron in a dispersed form sheathed in a protective coating of corrosion resistant material.

It is yet another object of this invention to provide a method for manufacturing such control rods containing boron in a dispersed form and sheathed with a protective coating of corrosion resistant metal.

Other objects and advantages of the invention will become apparent by consideration of the following description taken in conjunction with the accompanying drawings, of which:

FIG. 1 is a perspective view of a control element manufactured according to the method of this invention.

FIG. 2 is a section of the control element of FIG. 1 along lines 22—22.

FIG. 3 is a section of a control element similar to that of FIG. 2.

FIG. 6 shows a compact used in the production of the control rod of FIG. 3.

Figure 4:
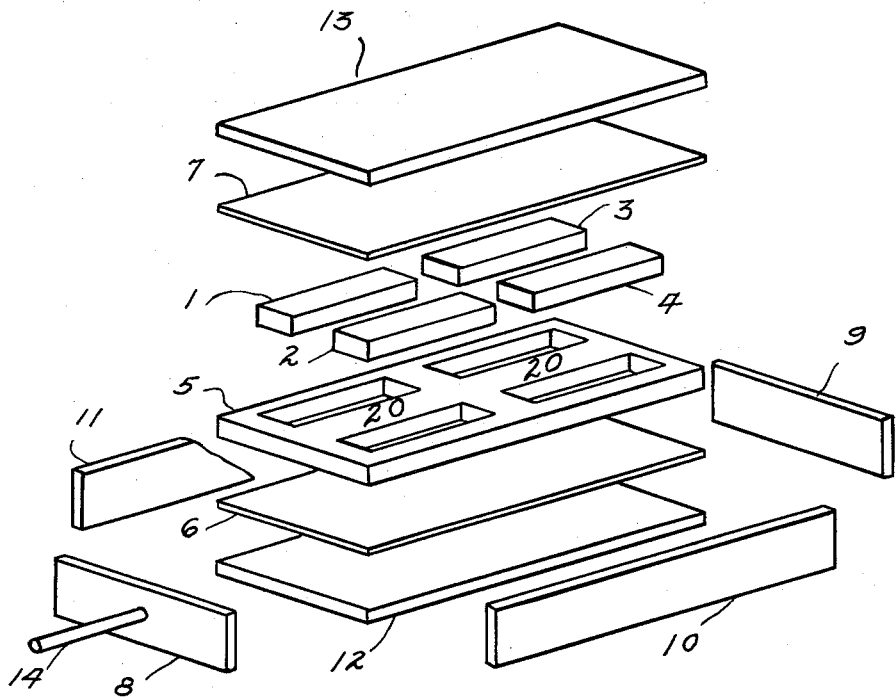
FIG. 4 is an exploded view of a control element compact with its associated cladding and jacketing prior to processing.

The control rod of this invention consists essentially of a powder dispersion containing control particles of a neutron absorbing material, clad with a suitable non-control material. The control rod blades of these composites are made by roll bonding picture-frame type packs consisting of the control particle-matrix powder mixture surrounded by cladding frames and cover sheets.

The control particles are discrete particles of elemental boron enriched in the boron$^{10}$ isotope, or in a preferred embodiment, particles of titanium diboride ($TiB_2$), also enriched in boron$^{10}$. The titanium diboride embodiment is preferred since dispersions containing this compound seem to have greater radiation stability than those containing elemental boron as the dispersant. While applicant does not wish to be bound by theory, it appears that the damage results from the helium generated by the reaction of boron$^{10}$ with thermal neutrons, and that the titanium diboride has a greater capacity for the retention of helium than the elemental boron$^{10}$. Metallographic examination of certain test specimens showed structural damage and cracking in a 2.43 weight percent dispersion containing elemental boron which had been irradiated to $9.4 \times 10^{20}$ nvt. Samples of the 8 weight percent titanium diboride dispersion did not show any internal cracking after exposures up to $5.04 \times 10^{20}$ nvt. The results of further tests involving dispersions with even higher loadings are summarized in Table I:

TABLE I

*Visual examination of clod irradiation specimens*

| Specimen Number | Core Material | Exposure nvt | Visual Observations |
|---|---|---|---|
| 1 | 5 w/o B$^{10}$—Ti | $4.68 \times 10^{20}$ | No cracks or swelling. |
| 2 | 5 w/o B$^{10}$—Ti | $3.7 \times 10^{20}$ | Do. |
| 3 | 5 w/o B$^{10}$—Ti | $9.5 \times 10^{20}$ | Some swelling, minor cracks. |
| 4 | 5 w/o B$^{10}$—Ti | $19.7 \times 10^{20}$ | Severe clad-core separation. |
| 5 | 34 w/o TiB$^{10}_2$—Ti | $5.5 \times 10^{20}$ | No cracks or swelling. |
| 6 | 34 w/o TiB$^{10}_2$—Ti | $1.2 \times 10^{21}$ | Do. |

The dispersion matrix is metallic titanium powder. Titanium was selected on the basis of the ready availability of titanium powder, its high strength good ductility and low density. The cladding material is an alloy of zirconium commonly referred to as "Zircaloy-2," the composition of which is fully described and disclosed in U.S. Patent 2,772,964, "Zircaloy-2" is defined in claim 4 of said patent as "an alloy consisting of from 1.3% to 1.6% by weight of tin, from 0.07% to 0.12% by weight of chromium, from 0.04% to 0.08% by weight of nickel, from 0.09% to 0.16% by weight of iron, carbon not exceeding 0.05%, less than 0.5% by weight of incidental impurities, and the balance being zirconium. This zirconium alloy is employed because of its excellent corrosion resistance, and its compatibility with the titanium of the matrix. Also, in the event of structural damage in the dispersion due to irradiation, this cladding metal will provide strength.

Mechanically comminuted 40 mesh titanium powder was used as the matrix material for these dispersions. The enriched boron was obtained in the form of unground shards and then crushed to a −20 +80 mesh particle size. Enriched titanium diboride was obtained by reacting the elemental powders and subsequently crushing to the same particle size. Reactor grade Zircaloy-2 was used for all claddings.

The exact percentages of boron or titanium diboride added to the mixture will vary according to several factors, among which are the requirements of reactor design, and the degree of enrichment of the material in the boron$^{10}$ isotope. Good results were achieved with loadings of 2.43 weight percent boron, or 8 weight percent titanium diboride; and mixtures containing as much as 5 weight percent boron or 34 weight percent titanium diboride have been successfully employed.

The properly sized particles of boron, or of titanium diboride, are mixed with titanium powder, and then compacted into generally rectangular masses. These masses are then made the "meat" in a "picture frame" type of cladding pack. Reference to FIGURE 4 shows an exploded view of a cladding pack together with its associated protective jacket, prior to formation of the control rod blades by hot rolling. Four boron-titanium dispersion compacts, 1, 2, 3 and 4, of generally rectangular shape, are loaded into a frame 5 of zirconium alloy having provided therein four spaces to receive the dispersion mixture compacts. Cover plates of zirconium alloy 6 and 7 are then placed over the compacts and frame, and the entire assembly is jacketed by surrounding it with front and back plates 8 and 9, side plates 10 and 11, and top and bottom plates 12 and 13 of a protective metal such as "Ti-Namel," which is a low carbon enameling steel stabilized with titanium, stainless steel or other suitable metal. The jacketed assembly is then evacuated through tube 14 which is then sealed. The assembly can then be hot rolled without danger of the cladding or dispersion compacts reacting with the atmosphere. The method of assembling and hot rolling these picture frame packs is exactly the same as that shown in U.S. Patent 2,820,751 to H. A. Saller, and in co-pending application 751,574 of Robert E. Droegkamp, filed July 28, 1958, now abandoned, and reference is hereby made to this patent and to this co-pending application for a full and complete discussion of the details of cladding compacts by the "picture frame" technique. As will be appreciated, the cladding techniques discussed in the above mentioned patent and application are applicable here even though the patent and application deal with the cladding of fuel compacts while this invention is concerned with the cladding of control material compacts.

Figure 5:
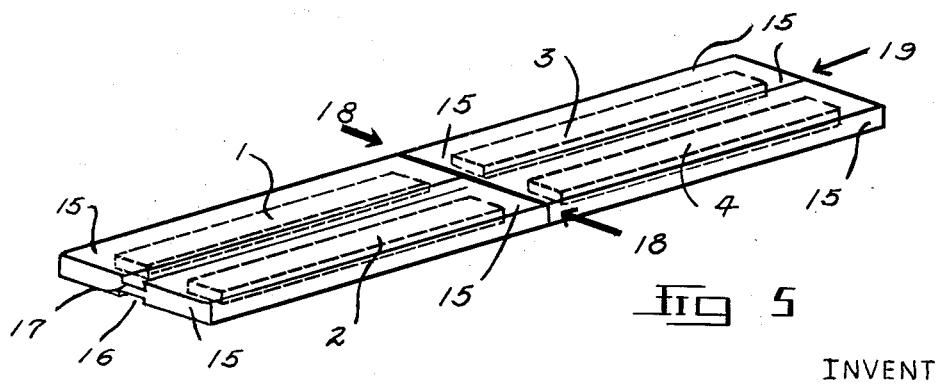
FIG. 5 is a view of the same compact after rolling but before being sectioned and welded together in the shape of the control element of FIG. 2.

After sealing of the jacket, the picture frame assembly is hot rolled, and, after cooling, the jacket is stripped off leaving an elongated compact such as that shown in FIGURE 5 wherein the boron dispersion masses 1, 2, 3 and 4 are now surrounded by a tenaciously bonded cladding of Zircaloy-15. In the course of the hot rolling the titanium particles of the matrix have coalesced, and since the zirconium and titanium are mutually soluble, the bonding between the titanium matrix and the zirconium cladding is excellent.

Test samples consisting of dispersion cores measuring 0.260 in. x 1 in. x 3 in. contained in Zircaloy-2 picture frame type claddings measuring 0.380 in. x 1.5 in. x 3.5 in. were successfully fabricated by this technique. The components were sealed in an evacuated "Ti-Namel" jacket, heated to 1550° F. and then rolled at reductions of 20% per pass. The packs were given 10 minute reheats between passes and reduced a total of 67%. The "Ti-Namel" was then removed by breaking the frames and stripping the cover plates. Good bonds were attained in all cases. During the course of the bond testing it was found that an anneal of from 1 to 4 hours at 975° F. improved the bonding.

The rolled and elongated control rod blank, shown in FIGURE 5, is then cut transversely along line 18—18, to produce one section containing boron dispersion masses 1 and 2. Two rectangular grooves 16 and 17 are then machined in opposite faces of this section, while the other section containing boron dispersion masses 3 and 4 is slit lengthwise along line 19.

The three pieces thus obtained from the control rod blank of FIGURE 5 are assembled by welding to give a rod with a cruciform cross section as shown in FIGURES 1 and 2. FIGURE 1 is a perspective view of the assembled control rod, while FIGURE 2 is a cross section along line 22—22, showing the location of the boron-titanium dispersion masses 1, 2, 3 and 4, sheathed in the Zircaloy cladding 15.

In the above described embodiment the edges of the Zircaloy cladding 15 from the picture frame assembly, are joined together to form the central welds of the cruciform section. In certain circumstances, this central zirconium portion of the control rod might permit too many neutrons to pass through the rod and since this might be undesirable for some uses, an alternative embodiment may be employed to overcome this objetcionable "window" effect. In this embodiment, the longitudinal central portion of the zirconium frame 20 is removed and there is substituted therefor a bar 21 of zirconium-hafnium alloy, or of pure or nearly pure hafnium. An examination of FIGURES 6 and 3 will show that, after sectioning of the control rod blank obtained by rolling the pack containing the hafnium member 21, and after subsequent assembly of the cut apart blades, a cross section of the coupled rod will look like FIGURE 3. This figure shows the location of the boron dispersions 1, 2, 3 and 4 and the Zircaloy cladding 15. It also shows the location of the hafnium-zirconium alloy 21 which prevents escape of neutrons through the central portion of the rod.

Accordingly it will be understood that other embodiments and modifications of this invention are possible, and it is not intended to limit the invention by the foregoing, but to limit it only by the scope of the appended claims.

I claim:
1. A neutronic reactor control rod formed from a compacted powder dispersion consisting of titanium diboride dispersed in a matrix of metallic titanium, and sheathed with a cladding of an alloy consisting of from 1.3% to 1.6% by weight of tin, from 0.07% to 0.12% by weight of chromium, from 0.04% to 0.08% by weight of nickel, from 0.09% to 0.16% by weight of iron, carbon not exceeding 0.05%, less than 0.5% by weight of incidental impurities, and the balance being zirconium.

2. A neutronic reactor control rod formed from a compacted powder dispersion consisting of titanium diboride enriched in the boron$^{10}$ isotope dispersed in a matrix of metallic titanium, and sheathed with a cladding of an alloy consisting of from 1.3% to 1.6% by weight of tin, from 0.07% to 0.12% by weight of chromium, from 0.04% to 0.08% by weight of nickel, from 0.09% to 0.16% by weight of iron, carbon not exceeding 0.05%, less than 0.5% by weight of incidental impurities, and the balance being zirconium.

3. A neutronic reactor control rod having a cruciform cross section possessing four blades, each blade having a core of a compacted powder dispersion consisting of titanium diboride enriched in the boron$^{10}$ isotope dispersed in a matrix of titanium, and sheathed with a cladding of an alloy consisting of from 1.3% to 1.6% by weight of tin, from 0.07% to 0.12% by weight of chromium, from 0.04% to 0.08% by weight of nickel, from 0.09% to 0.16% by weight of iron, carbon not exceeding 0.05%, less than 0.5% by weight of incidental impurities, and the balance being zirconium, said blades being welded together along their longitudinal edges.

4. A method for fabricating a neutronic reactor control rod as defined in claim 3 which comprises the steps of mixing titanium powder with the powders of the titanium diboride enriched in the boron[10] isotope, providing a rectangular plate made of the Zr—Sn—Cr—Ni—Fe alloy mentioned in claim 3 having a left pair and a right pair of rectangular openings of the same size and shape therein, placing a mass of the said powder mixture in each of these four openings, placing sheets made from said Zr—Sn—Cr—Ni—Fe alloy on opposite sides of said plate, enclosing said plate and cover sheets with a jacket of protective metal, sealing and evacuating the protective enclosure so formed, hot rolling the sealed and evacuated assembly, cooling and stripping the protective metal jacket from the assembly, sectioning the resultant control rod blank transversely to the direction of rolling and between the sections containing the left pair and the right pair of the compacted masses of the enriched boron containing dispersion, machining longitudinal grooves in the center of opposite faces of one of the sections so produced and between the compacted masses of the enriched boron containing dispersion enclosed therein, cutting the other section longitudinally so that each piece produced contains one compacted mass of the enriched boron containing dispersion, welding the longitudinal edges of the pieces so produced into the grooves machined in said previously cut section so as to produce a four bladed, cruciform shaped rod.

5. A neutronic reactor control rod having a cruciform cross section possessing four blades; each blade having a core of a compacted powder dispersion consisting of titanium diboride enriched in the boron[10] isotope, dispersed in a matrix of titanium, sheathed with a cladding of an alloy consisting of from 1.3% to 1.6% by weight of tin, from 0.07% to 0.12% by weight of chromium, from 0.04% to 0.08% by weight of nickel, from 0.09% to 0.16% by weight of iron, carbon not exceeding 0.05%, less than 0.5% by weight of incidental impurities, and the balance being zirconium, said rod having the longitudinal central portion where the blades cross composed of a metal selected from the group consisting of hafnium and an alloy of hafnium and zirconium, said blades being welded together along their longitudinal edges.

References Cited in the file of this patent

UNITED STATES PATENTS 2,820,751    Saller    Jan. 21, 1958

OTHER REFERENCES

Proceedings of International Conference on Peaceful Uses of Atomic Energy, August 8–20, 1955, vol. 3, pages 252–255.

KAPL–1915, Development of Composite Control Rods for Water Cooled Power Reactors, by W. E. Ray, dated October 15, 1957, pages 1–7, 16.

Nuclear Science and Engineering, vol. 4 (September 1958), pages 449–453.

Power Reactor Technology, vol. 1 (No. 1, December 1957), pages 30–31.